Figure 1:
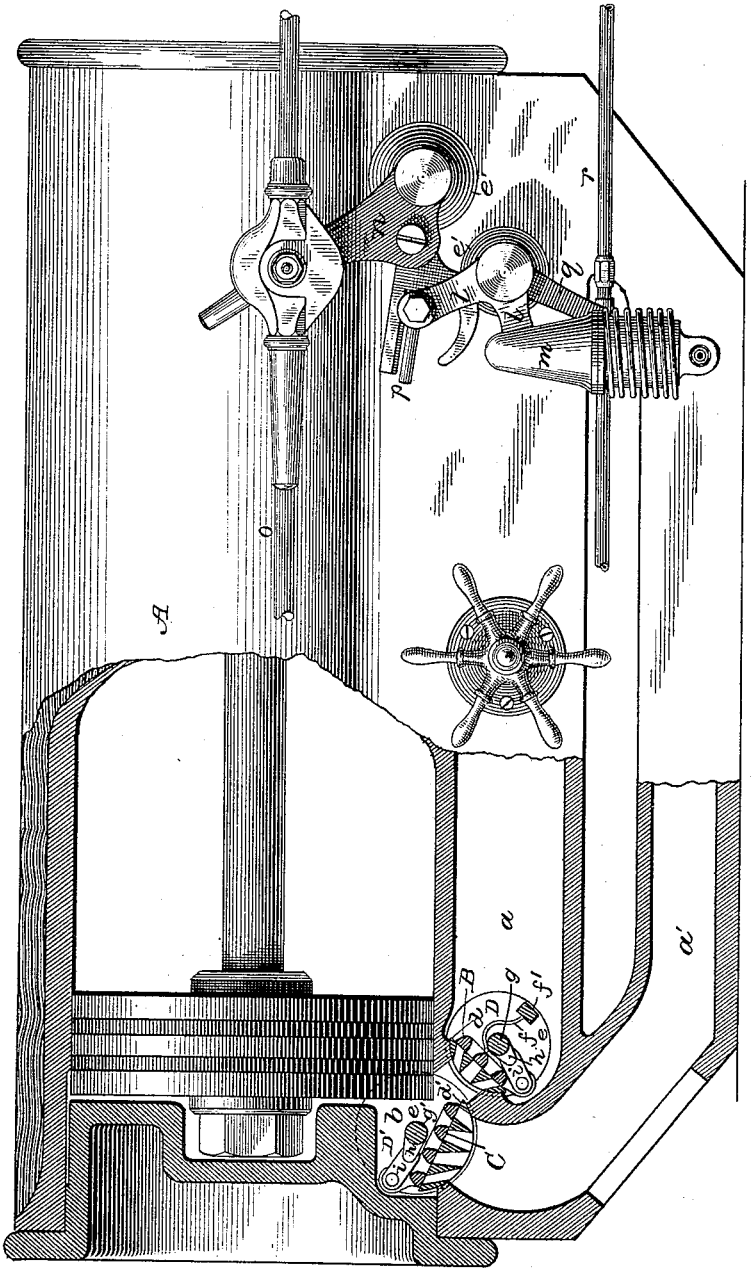

(No Model.) 2 Sheets—Sheet 1.

J. WHEELOCK.
VALVE FOR STEAM ENGINES.

No. 326,820. Patented Sept. 22, 1885.

Attest:
Philip F. Larner
Howell Battle

Inventor:
Jerome Wheelock.
By Wm C Wood
Attorney.

(No Model.)
J. WHEELOCK.
VALVE FOR STEAM ENGINES.
No. 326,820.    Patented Sept. 22, 1885.
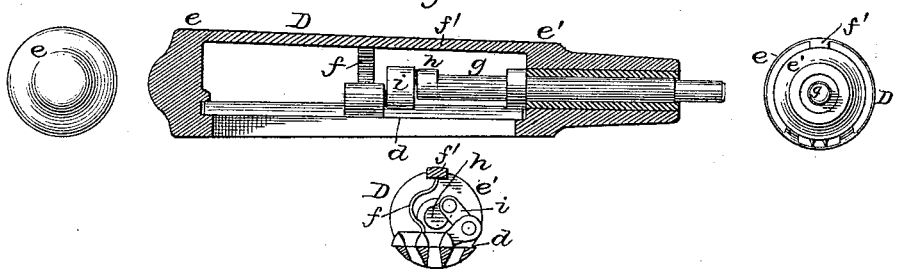
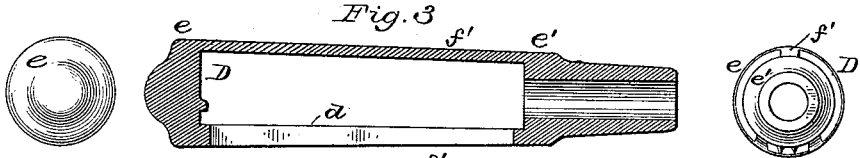
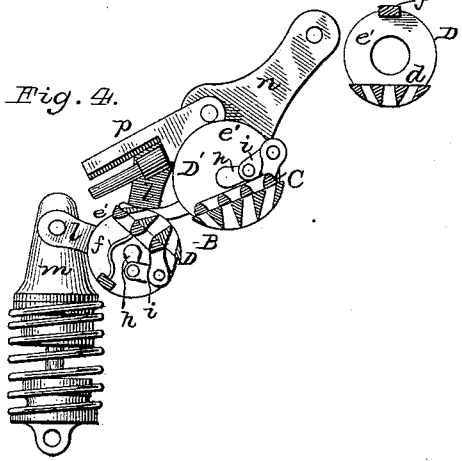 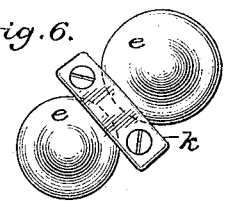
Attest:
Philip F. Larner
Howell Bartle
Inventor:
Jerome Wheelock
By Wm B Wood
Attorney

UNITED STATES PATENT OFFICE.

JEROME WHEELOCK, OF WORCESTER, MASSACHUSETTS.

VALVE FOR STEAM-ENGINES.

SPECIFICATION forming part of Letters Patent No. 326,820, dated September 22, 1885.

Application filed June 12, 1885. (No model.)

*To all whom it may concern:*

Be it known that I, JEROME WHEELOCK, of the city and county of Worcester, in the State of Massachusetts, have invented certain new and useful Improvements in Steam-Engines; and I do hereby declare that the following specification, taken in connection with the drawings furnished and forming a part of the same, is a clear, true, and complete description of the several features of my invention.

One object of my invention is to simplify and to economize in the construction of such steam-engines as embody in their cylinder-castings valve-seats integral with said castings, and valves which are or may be operated by rock-shafts. Instances of such engines will be found in my Letters Patent No. 144,174 and No. 249,864, dated, respectively, October 28, 1873, and November 22, 1881, wherein are shown tapered holes beneath the cylinder which afford the valve-seats, and within each of said holes is a tapered valve, which is semi-rotated by means of a rock-shaft, upon which it is axially mounted, and said shaft has its bearings in bonnets at the two sides of the cylinder-casting.

Now, in accordance with one portion of my invention, I provide tapered holes in the cylinder-casting, as before, but without any valve-seat therein. Regardless of the character of the valve, provided it is operated by a rock-shaft, I mount it in a skeletonized plug containing a valve-seat preferably integral therewith, or it may be attached thereto, and also having ends or heads which serve as bonnets to the valve-chamber and afford one or two bearings for the rock-shaft by which the valve is operated. With this construction the plug can be first fitted to its housings, and then after its removal its valve-seat can be conveniently worked up, the valve mounted thereon, the rock-shaft placed in its bearings, coupled to the valve, and put into perfect working order on a work-bench, and then all these parts as a whole can be easily inserted into the plug-housing and be ready for service. In doing this I avoid valve-seats on the cylinder-casting, the great trouble of forming or finishing them, which is always incident to working on a heavy mass of metal, and the difficulty of repairing them when unduly worn.

The internal steam-pressure being equal against both ends or heads of the plug, no bolting is requisite at both ends, as in the case of bonnets, it being obvious that the merest abutment for the outer surface of the plug at its large end will prevent its working outwardly, as well as prevent all accidental variation in rotative adjustment. I have embodied this portion of my invention with semi-rotating valves, and also with slide-valves, and although it is in this latter connection that this portion of my invention is of the greatest value I will illustrate and describe it in connection with both forms of valve.

Another object of my invention is to provide, with a slide steam-valve operated by liberating cut-off, valve-gear, including a dash-pot weight, for a complete closure of the valve before the weight of the dash-pot reaches or enters its checking-space. This I accomplish by means of a rock-shaft, coupled by a rigid arm with a dash-pot weight and a steam slide valve, which is coupled to the rock-shaft by a crank-arm and a link, so that these latter may be so arranged that when the valve has been closed by the weight the crank-arm will then pass its center during the entrance of said weight into its checking-space, and without further movement of the valve. This combination of slide steam-valve, rock-shaft, crank, link, and dash-pot weight is believed to be new and of substantial value, even if they be not arranged as described, to afford the desired lost motion between the crank and valve, or, in other words, with a crank which does not pass its center and stand in line with the link.

In my pending application filed November 8, 1884, Serial Number 147,403, I disclosed a novel combination embracing a semi-rotating steam-valve and a slide exhaust-valve, and this latter was operated by a rock-shaft, a crank-arm thereon, and one or more links, and in that combination there is a similar lost motion between the rock-shaft and slide-valve to that which I now have, but without the results now sought and obtained by me in connection with a steam or induction valve. With my said prior organization I obtained a desirable clearance, but with my present invention that feature is considerably improved, as I am now enabled to locate my exhaust and steam valves in very close proximity to each other, and to have them co-operate with one cylinder-port more closely adjacent to the end of the cylinder than has, I believe, ever before been possible with any form of valve.

Certain minor improvements have also been devised by me, and after fully describing their embodiment by me as illustrated in the drawings the features deemed novel will be specified in the several clauses of claims hereunto annexed.

Referring to the drawings, Figure 1 in partial section and side elevation illustrates a steam-engine cylinder with my improvements in what I deem their best form, applied thereto. Fig. 2 in several views illustrates a side valve, its seat, rock-shaft, and skeletonized plug detached, as when all set up and ready for insertion bodily into a tapered hole serving as its housing in a cylinder-casting—as, for instance, as shown in Fig. 1. Fig. 3 in several views illustrates one of the valve-plugs stripped of all the parts mounted thereon. Fig. 4 is a partial side and sectional view illustrating the slide-valves with their seats, the rock-shaft, its crank, link, dash-pot weight, and its outside arm or levers. Fig. 5 in several views illustrates a similar skeletonized valve-plug, with a concave valve-seat and a semi-rotating valve, and a rock-shaft mounted therein. Fig. 6 is a view of the valve-plugs at their large ends, and a strap-plate by which they are secured in position for service.

The cylinder A may be variously constructed without affecting my present invention, it being immaterial in what form the steam-chests or exhaust-passages may be, if they are susceptible of affording housings for the reception of valves as organized by me. A desirable arrangement of steam and exhaust passages $a$ and $a'$ below the cylinder is here shown, the same being substantially as heretofore disclosed by me in my aforesaid Letters Patent No. 249,864, and both of said passages are in communication with the interior of the cylinder, at each end thereof, by way of a port, $b$.

Closely adjacent to each of said ports the steam-valve B and exhaust-valve C are located. The cylinder-casting is transversely bored through the side walls of the steam and exhaust passages adjacent to their junction with either port, and this has been in part heretofore done by me to afford a tapering valve-seat for my semi-rotating tapered valves; but the holes are now thus tapered for the snug reception of novel skeletonized valve-plugs D and D'. The steam-valve B and its plug D differs from the exhaust-valve C and its plug D' only in being smaller and in having some kind of light spring for supporting the valve B when not backed by steam, because said valve is in this instance below its seat $d$, and these unusual positions are incidental to this particular organization, devised with special reference to desirable clearance. The combination of the plug, its seat, and a slide-valve backed by a spring is of special value, because the valve is thus held to its seat regardless of the rotative adjustment of the plug.

Both plugs D and D' are tapered, and each has a valve-seat, $d$ or $d'$, and so, also, each plug has ends or heads $e$ and $e'$, with which their respective valve-seats are either rigidly connected or, preferably, integral, and the heads $e$ are as much larger in diameter than the heads $e'$ as would be due to such a tapered outline as would secure a firm, tight seating of the plugs in their housings. For affording a seat for a spring, $f$, whether bent, as shown, or spiral, at the back of the steam-valve B, the plug D has a longitudinal bar, $f'$, opposite the valve-seat $d$ and parallel therewith. Whether this bar be present or not, the plugs are skeletonized, in that each end is a perfect plug, and said ends are rigidly connected by a valve-seat.

The two heads $e$ and $e'$ of each plug D and D' may be centrally or otherwise bored for the reception of two ends of a shaft, as when arranged to operate a rotating or semi-rotating valve; but when said shaft is arranged to operate a slide-valve the smaller head, $e'$, need only be bored, as here illustrated; but in this case said head is provided with a long sleeve-bearing, so as to properly support said shaft, which need only extend inwardly to a point approximating more or less to the longitudinal center of the valve.

As here shown, each valve has a rock-shaft, $g$ $g'$, each having at its inner end a crank, $h$, and this is coupled by a link, $i$, to its respective slide-valve, and for obtaining the best results said valves should be of the gridiron variety, to afford ample opening with a short range of movement. By having the rock-shaft bearings eccentrically located in the heads $e$ any desired space can be afforded between the rock-shaft and the back of the valve, and thus provide for any desired length of crank and link.

The exhaust-valve C, its link $i$, rock-shaft $g'$, and crank $h$ are all substantially as disclosed in my aforesaid application for Letters Patent filed November 8, 1884, Serial No. 147,403, when these are considered separately from the skeletonized plug on which they are now mounted as by me for the first time; but therein such a valve is shown to be organized to co-operate with a semi-rotating steam-valve, and both of their rock-shafts were mounted in bonnets bolted to the outside of the cylinder-casting. With my skeletonized valve-plug it will be seen that the valve and rock-shaft may be properly connected therewith and inserted as a whole into operative position. One head of the plug being a little larger than the other, will be proportionately exposed to an excess of internal pressure; but a single strap-plate, X, with suitable bolts or screws, will only be needed for confining each pair of plugs in place, if arranged between and overlapping a portion of each of the largest ends e, as clearly indicated in Fig. 6. The exhaust slide-valve thus coupled by a link, crank, and rock-shaft to an eccentric-rod has special value because of the dwell afforded while the crank of the rock-shaft is passing its center, regardless of the character of the steam-valve with which it co-operates.

The novel combination of the rock-shaft, its crank, and link with the steam slide-valve as now organized by me affords results which do not accrue in a similar combination which includes the exhaust-valve, because the steam-valve is closed by a weight which is checked or cushioned in its fall by a dash-pot or its equivalent. With the slide-valve, link, and rock-shaft crank the induction or steam valve may be fully and quickly closed by the weight just before the rock-shaft crank reaches its center, and then as the weight enters its checking-space the crank can freely pass its center without moving the valve. This I deem an important feature in view of the well-known fact that cut-off valves generally are not properly closed by their weights whenever said valves have been barely opened, because the weights on entering their checking-space have not yet completed their duty in closing said valves, and as the weights have been only slightly lifted they cannot have sufficient momentum to enable them to properly control their valves.

As here shown, each rock-shaft g has at its outer end the bell-crank lever l, to one arm of which the dash-pot weight m is attached, as shown in my prior patents; but it will be seen that the character and construction of the weight and the variety of governing and liberating or tripping mechanism which may be employed therewith will in no manner vary this capacity of the weight to fully close the valve before it fairly reaches its checking-space, so that it may then continue its movement throughout its cushioned fall to a full rest without causing further movement of the valve. It will also be obvious that this portion of my invention is in no manner dependent upon the mounting of said valve and its rock-shaft in a skeletonized plug, as described, nor upon any special location of said valve either with reference to the cylinder or to the exhaust-valve co-operating therewith.

The two exhaust-valves, as in my prior engines, are coupled by arms n to the eccentric-rod o, and each of said arms is coupled to the lever l of the adjacent steam-valve by a latch-link, p, which is variably tripped by the cam-lever q, connected with the governor-rod r.

Now, for further illustrating the economic advantages of my novel valve-plug containing a valve-seat and a valve, and having heads which afford bearings for a rock-shaft by which the valve is operated, I will refer to Fig. 5, wherein instead of a slide-valve a semi-rotating valve, E, is shown with a concave valve-seat. In this case the valve is keyed to the rock-shaft g, and this has bearings in both of the heads of the plug. The ease and economy with which any valve capable of being operated by a rock-shaft can be mounted in a plug of this kind and applied to or removed from its housings in an engine-cylinder will be apparent. It will also be obvious that this construction affords the widest possible range of convenient adjustment. The plug can be rotatively adjusted to any desired position with relation to the steam and exhaust passages, and the rock-shaft can also be rotatively adjusted in its bearings and with relation to its external connections for obtaining any desired movement of the valve. In cases where undue detention in power must be avoided, the low cost of a pair of extra valve-plugs, with or without the valve and rock-shaft, will always warrent keeping such on hand to enable a change to be promptly made with any valve needing repairs.

Having thus described my invention, I claim as new and desire to secure by Letters Patent—

1. The combination, substantially as hereinbefore described, of a steam slide-valve, a rock-shaft having a crank thereon, a link coupling said crank centrally to the valve, an arm on said rock-shaft, and a dash-pot weight coupled to said arm, whereby said valve may be closed by said weight before the latter enters its checking-space, and may also be permitted to rest during the cushioned fall of said weight.

2. The combination, substantially as hereinbefore described, of a slide exhaust-valve, and a slide steam-valve co-operating with one cylinder-port, a rock-shaft for each valve-coupled thereto by a crank and a link, and an eccentric-rod, and external connections by which both valves are operated.

3. The combination, substantially as hereinbefore described, of a steam-engine cylinder and a tapered cylindrical skeletonized plug containing a valve-seat and a valve, and having heads which afford bearings for a rock-shaft by which the valve is operated.

4. The combination, with a steam-engine cylinder and a skeletonized tapered cylindrical plug containing a flat-valve seat, a slide-valve, a rock-shaft mounted in bearings in said plug, a crank on said rock-shaft, and a link for coupling said crank to the valve, substantially as described.

5. The combination, with the skeletonized plug having rock-shaft mounted therein, and containing a valve-seat and a slide-valve coupled by a link and crank to said shaft, of a spring at the back of said valve, substantially as described, whereby regardless of the rotative adjustment of said plug in its housing said valve will be properly held to its seat.

JEROME WHEELOCK.

Witnesses:
GEO. H. SOUTHWICK,
E. H. KNOWLTON.